United States Patent [19]
Voegtlin

[11] Patent Number: 4,634,364
[45] Date of Patent: Jan. 6, 1987

[54] DEVICE FOR THE POSITIVE DRAWING OF LUMPS OF DOUGH FOR THE INDUSTRIAL MANUFACTURE OF LONG LOAVES

[76] Inventor: René Voegtlin, 2, rue de la Colline, 67200 Strasbourg (Bas-Rhin), France

[21] Appl. No.: 738,060

[22] Filed: May 24, 1985

[30] Foreign Application Priority Data

May 29, 1984 [FR] France .................. 84 08632

[51] Int. Cl.⁴ ............................................. A21C 11/00
[52] U.S. Cl. .................................... 425/335; 425/343;
425/366; 425/367; 425/374; 425/394; 425/397;
425/402; 425/403.1
[58] Field of Search ............... 425/332, 383, 392, 394,
425/402, 403, 374, 397, 400, 403.1, 335, 337,
343, 363, 366, 367; 426/517, 512

[56] References Cited

U.S. PATENT DOCUMENTS 2,335,313 11/1943 Rowe et al. ................... 425/335
2,357,085 8/1944 Cohen et al. .................. 425/335

OTHER PUBLICATIONS

Fisher, "The Cooking of Provincial France", Time--Life Books, N.Y. (1968), pp. 78-79.

Primary Examiner—Willard E. Hoag
Attorney, Agent, or Firm—Robert E. Burns; Emmanuel J. Lobato; Bruce L. Adams

[57] ABSTRACT

The invention relates to a device for the positive drawing to great lengths of lumps of dough already pre-lengthened. This device is inserted between the shaper-lengthener and the chute in the automatic sequence of the different phases of treatment of an industrial manufacturing line for long loaves.

This device is characterized by having a turning group formed of a drive shaft driving in rotation, two series of discs diverging either side of the median plane and whose volume determines a drum, this turning group being subject to a continuous movement of rotation, and taking in the pre-lengthened lumps of dough and giving them back drawn after a trajectory of approximately a semicircle across a partial annular space making them roll against a fixed shell.

The invention concerns installations for the automatic shaping of long loaves.

15 Claims, 7 Drawing Figures

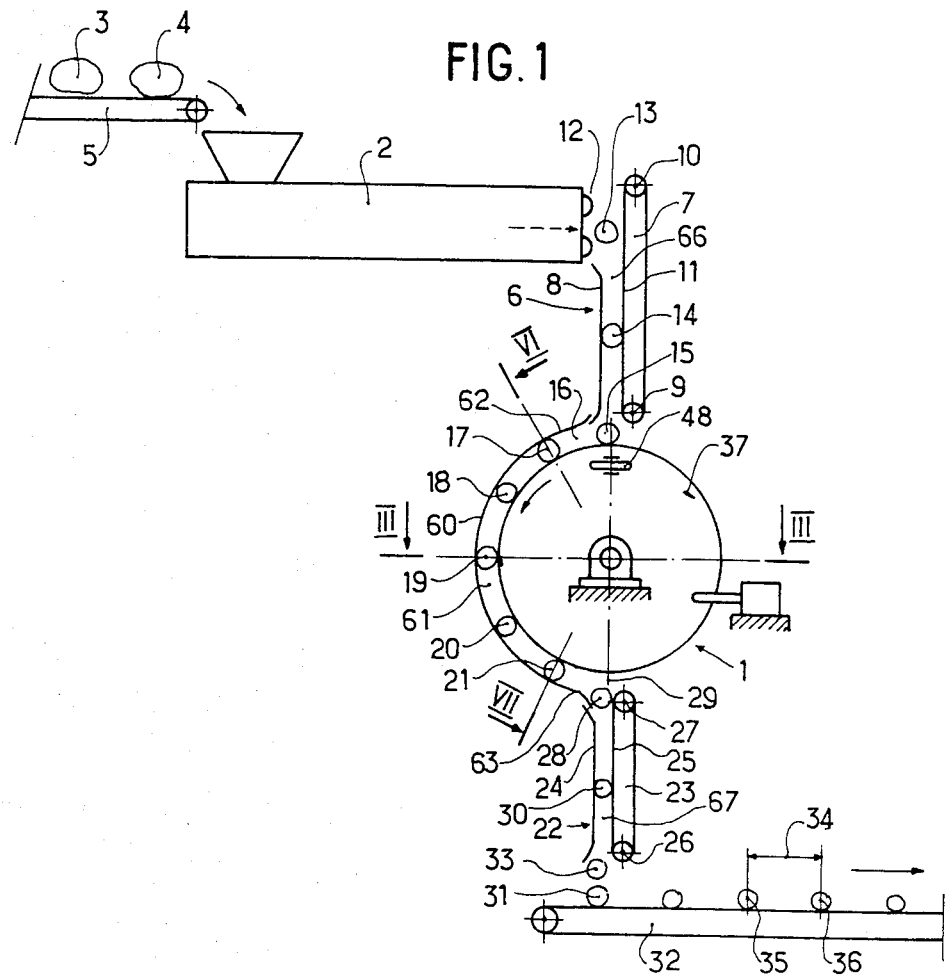
FIG. 1
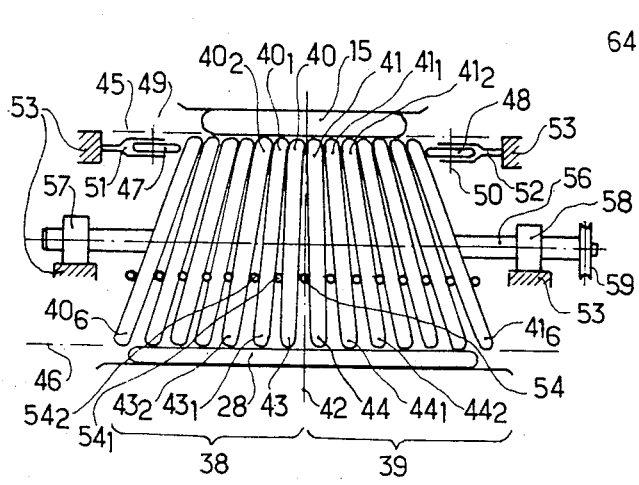
FIG. 2
FIG. 3

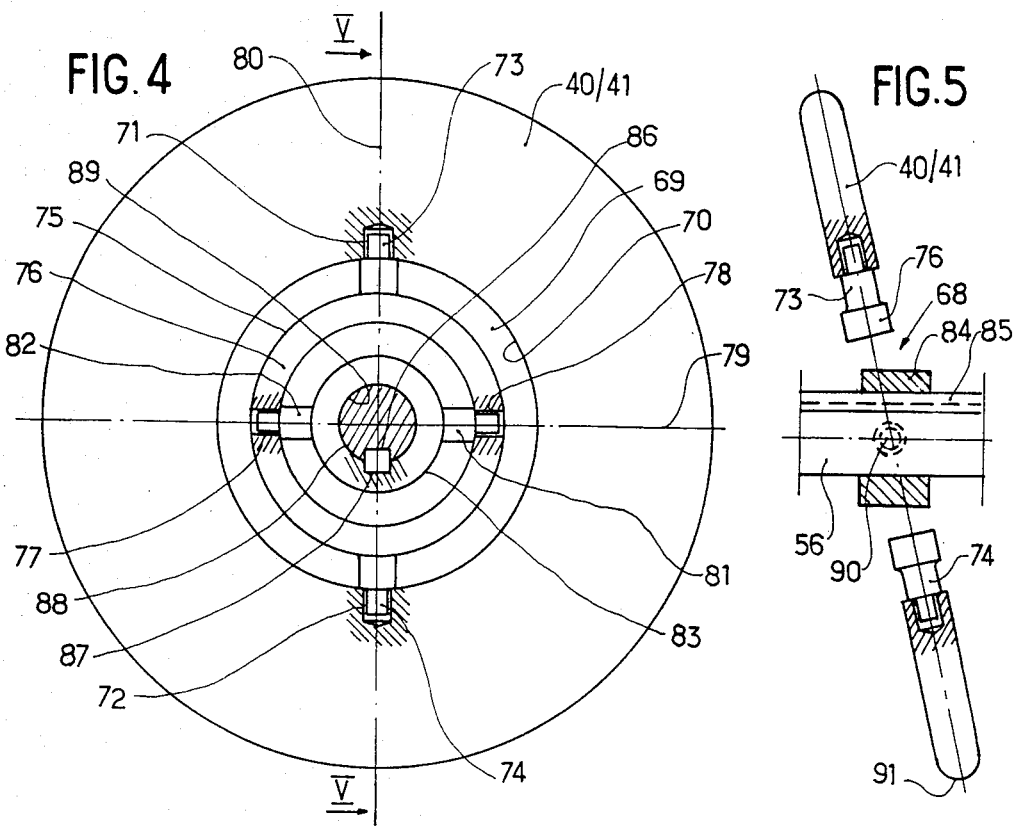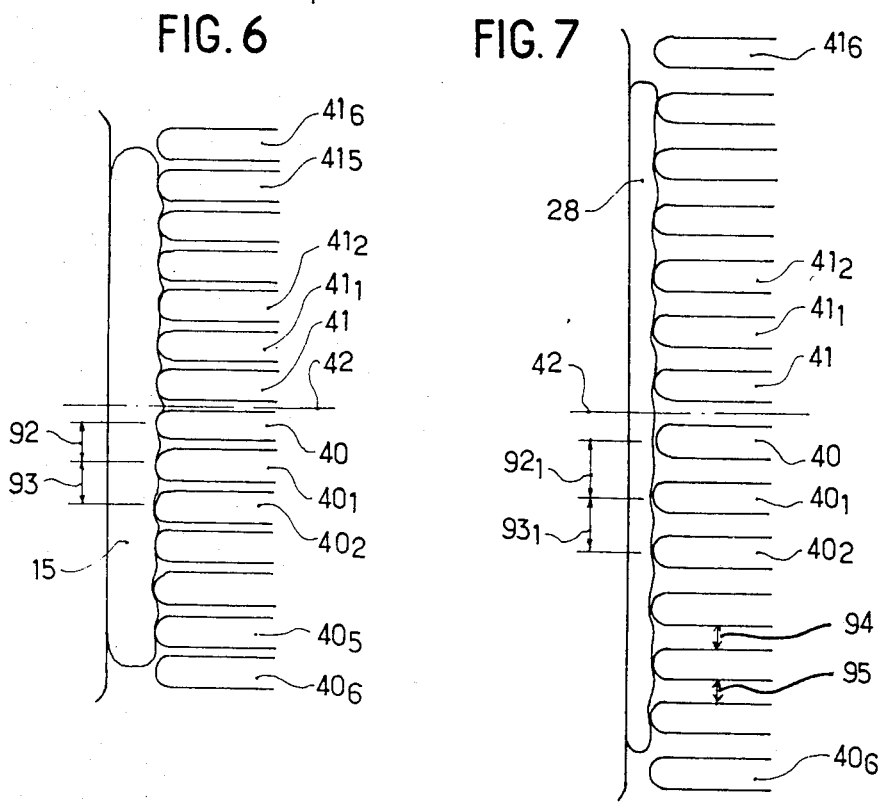

DEVICE FOR THE POSITIVE DRAWING OF LUMPS OF DOUGH FOR THE INDUSTRIAL MANUFACTURE OF LONG LOAVES

The invention relates to a device for the positive drawing to great lengths of already pre-lengthened lumps of dough. This device is inserted between the shaper-lengthener and the chute in the automatic sequence of the different phases of treatment of an industrial line for the manufacture of long loaves.

Machines which can draw pre-lengthened dough lumps are already known. Thus from the document No. FR-A-2 153 887 we already know a device for rolling and/or shaping in length of lumps according to which the lumps which may already be lengthened are displaced on a lower conveyor plane. Above the latter are disposed, with a gap which reduces progressively according to the direction of conveyance, two conveyor planes driven in a contrary direction towards the outside, almost transversally to the direction of conveyance. These two conveyor planes are formed by two endless conveyor belts aligned in relation to one another.

We also know, from the document No. FR-A-2 520 977 a device for additionally lengthening lumps of dough which have been pre-shaped, comprising a support which is immobile during the phase of treatment and formed by an endless carpet and a treatment caisson subject to a whole number of to-and-fro movements resting on the row of lumps to be treated. The direction of these to-and-fro movements is perpendicular to the longitudinal axis of the lumps, and the treatment caisson presents at least one horizontal surface which is perfectly flat and fitted with a carpet.

However, when these devices work by rolling the lumps between the carpets, they are ineffective in respect of the extra length conferred, and if the pressure between the carpets is accentuated, random creep is produced. This means that the extra length obtained varies from one loaf to another, which is incomptabile with the object of the exercise.

It is, of course, desirable for long loaves to have a uniform length, particularly if the lengthened lumps are intended for making rolls with the least possible loss of dough. Moreover, this difference in length is distinctly inconvenient if the long loaves are to be automatically packed.

There are also other devices which work with clamps or grabbers between rollers leading to individual treatment of the lumps with alternative mechanisms which are complicated and unreliable when the scrapers are raised. Thus we know from document No. FR-A-2 500 266 a device comprising, between the exit of a lengthener which gives the lumps their final length and a support for introducing the long lumps into the final fermentation chamber before they are baked, an anti-retraction group which grasps the long lumps as they come out of the lengthener and maintains them at their final length, cooperating with a stabilizer-mangle which loosens the texture of the lumps and cancels the residual mechanical stresses of the long lumps to deposit them automatically in the final fermentation chamber. This anti-retraction group comprises a number of bent levers, each of them pivoting freely around a common axis. Each lever is provided with a curved palette, the trough of which faces the exit of the lengthener.

Finally, we also know machines with divergent bands or belts. Though they provide a better result, they are very cumbersome and complex in manufacture and are thus expensive to buy.

SUMMARY OF THE INVENTION

The aim of this invention is to overcome these disadvantages. The invention, as characterized in the claims, solves the problem of creating a device for the continuous mechanical drawing of pre-lengthened lumps, this drawing being made without sequential movements as the lumps come out of the shaper.

The advantages obtained from this invention consist essentially in the fact that the additional length conferred on the lumps always corresponds very positively and in a repetitive manner to their initial length with the aid of a device of very compact design and great simplicity. The resulting device is both very reliable and inexpensive.

For this purpose, the invention concerns a device for positively drawing to a great length already pre-lenghtened lumps. This device is inserted between the shaper-lengthener and the chute in the automatic sequence of the different phases of treatment of an industrial line for manufacturing long loaves. It is characterized by the fact that it comprises a turning group, formed by a drive shaft driving in rotation two series of discs diverging either side of the median plane and whose volume determines a drum, this turning group being subject to a continuous rotating movement, taking in the prelengthened lumps and giving them back drawn after a trajectory of approximately a semicircle across a partial annular space, and making them roll against a fixed shell.

According to another characteristic of the invention, the two series of divergent discs are disposed in such a way that when the prelengthened lumps enter the annular space, the discs are joined, whereas when the drawn lumps come out of the annular space, the divergent discs are at their maximum spacing.

This means that each portion of length of the lump comprised between two discs is subject to a drawing positively equal to the free space between two discs on the line where the drawn lump leaves the annular space.

The drawing for giving the prelengthened lumps their additional length, corresponds to the sum of the elementary drawings made between two consecutive sets of divergent discs.

BRIEF DESCRIPTION OF THE DRAWING

The invention can be clearly understood by referring to the following description which is given as a non-limitative example and to the attached drawing in which:

FIG. 1 is a view in elevation of the drawing device made in conformity with this invention and placed in the manufacturing line for long loaves.

FIG. 2 is a view according to the arrow $F_1$ of FIG. 1 of the drawing device.

FIG. 3 is a plane view of the drawing device according to the section III—III of FIG. 1.

FIG. 4 is an elevation of a divergent disc mounted on the drive shaft.

FIG. 5 is a view in section, according to the section V—V of FIG. 4 of the divergent disc.

FIG. 6 is a partial view, according to section VI of FIG. 1, of the turning group with a lump which is at the end of the drawing phase.

FIG. 7 is a partial view, according to section VII of FIG. 1, of the turning group with a lump which is at the end of the drawing phase.

DESCRIPTION OF THE PREFERRED EMBODIMENT

Referring to FIG. 1.

The drawing device 1, in conformity with the invention, is incorporated in a line for the industrial manufacture of long loaves of dough, and more particularly between a shaper-lengthener 2 and a final fermentation chamber (not shown). The shaper-lengthener 2 is fed with balls of dough 3, 4 by a conveyor 5 disposed between this shaper-lengthener 2 and a prefermentation chamber.

Above the drawing device 1 there is a feed group 6. This is composed of a conveyor 7 and a fixed wall 8. The conveyor 7 comprises a motor drum 9 and a driven drum around which rolls an endless carpet 11. This takes up the pre-lengthened lumps 13 as they come out of the exit 12 of the shaper-lengthener 2, then it makes the lumps 14 roll along the fixed wall 8 to present them at 15 at the entry 16 of the drawing device 1, then it makes these lumps 30 roll along the fixed wall 24 to depose them at 31 on a conveyor 32 which carries them towards the final fermentation chamber. When they are deposed, this conveyor 32 is immobile. A photo-electric cell 33 triggers the advance of this conveyor after each passage of a lump. The pitch of this advance is regulated in function of the distance 34 between two successive lumps 35, 36 which it is desired to obtain.

The conveyor 32 can also transport flat plates, moulds or ribbed plates to receive the drawn lumps and serve as a support for them in the final fermentation and then the baking.

Referring to FIGS. 1 to 3. In conformity with the invention, the drawing device 1 comprises a turning group 37. This turning group 37 generates a volume determining a drum. This turning group 37 is composed of two series 38,39 of discs 40, $40_1$, $40_2$ ... and 41, $41_1$, $41_2$. There may be any number of discs 40, $40_1$, $40_2$ ... and 41, $41_1$, $41_2$ ... However, a number around ten is recommended for each of the two series 38,39. The discs 40, $40_1$, $40_2$ ... and 41, $41_1$, $41_2$ ... diverge either side of the median plane 42 of the drawing device 1 which also constitutes the central axis of the prelengthened lump 15 and the drawn lump 28. At the entry 16 of the drawing device 1, these discs are separate from one another, and they separate further and further from the median plane 42. The circumferences 43, $43_1$, $43_2$ ... and 44, $44_1$, $44_2$ ... of these discs 40, $40_1$, $40_2$ ... and 41, $41_1$, $41_2$ ... are situated in the same upper horizontal plane 45 and in the same lower horizontal plane 46. This implies for each disc 40, $40_1$ $40_2$ ... and 41, $41_1$, $41_2$ ... of each series 38, 39 going from the median plane 42 to the extremity of a different diameter which increases from the disc 40, 41 closest to the median plane 42 up to the disc at the extremity 40, 41 the farthest from this median plane 42, the discs being more and more inclined.

At the entry 16 of the drawing device 1, the discs 40, $40_1$, $40_2$ ... and 41, $41_1$, $41_2$ ... are maintained against each other by the pressure of the rollers 47, 48 pivoting round a vertical axis 49, 50 maintained by covers 51, 52 forming one piece with any chassis 53 (practically not shown).

The gap, conditioning the divergence between the discs 40, $40_1$, $40_2$ ... and 41, $41_1$, $41_2$ ..., is ensured by blocking studs 54, $54_1$, $54_2$ ... each penetrating between two consecutive discs 40, $40_1$, $40_2$ ..., 41, $41_1$, $41_2$ ... The studs 54, $54_1$, $54_2$ ... have an identical diameter and form a comb, and are in one piece with a traverse 55, fixed to the chassis 53.

The turning group 37 is driven by a drive shaft 15 maintained by bearings 57, 58 which are in one piece with the chassis 53 and activated by a motor element either directly coupled to the shaft drive, or indirectly via some sort of transmission 59. The fixing of the discs 40, $40_1$, $40_2$ ... and 41, $41_1$, $41_2$ ... on the drive shaft 56 definitively materializes the inclination of each disc.

For drawing the lumps, the turning group 37, cooperates with a fixed shell 60 which delimits a partial annular space extending approximately to the semi-circumference of the turning group 37 and necessary to the operation of drawing. The fixed shell 60 comprises at the entry 16 and the exit 29 of the drawing device 1 an entry generator 62 and an exit generator 63 which are more or less straight, whereas at midheight between these two generators 62, 63, corresponding to the plane of the section III—III of FIG. 1, the fixed shell 60 presents a curved generator 64 which is more or less parallel with the curved generator 65 of the turning group 37. The spacing between the latter and the fixed shell 60 will be slightly degressive from the plane of section VI to the plane of section VII of FIG. 1, to take account of the thinning of the lump as it is drawn.

As the loaves which it is desired to produce vary in weight and diameter, means of adjustment are provided to modify the space 66 between the endless carpet 11 and the fixed wall 8 of the feed group 6, the space 6 between the endless carpet 25 and the fixed wall 24 of the disengagement group 22, and the spacings at different points between the turning group 37 and the fixed shell 60. These means of adjustment, which are not shown, may be of any sort, and can, for example, be systems of small rods. As the fixed shell 60 has to adapt to different curves according to the gaps, it would be advantageous to make it in a deformable material, for example a sheet of thin steel lined with felt on its useful inside face.

We refer to FIGS. 4 and 5 representing, as a nonlimitative example, a way of realising the drives of the discs 40, $40_1$, $40_2$ ..., 41, $41_1$, $41_2$ ... ; this drive could be a drive articulated at the cardan shaft 68. Each disc 40, 41, comprises a bore 69. In the wall 70, two housings 71, 72 are made, diametrically opposed, in which are housed pivots 73, 74, projecting in relation to the external circumference 75 of an intermediate ring 76. In this intermediate ring 76, two housings 77, 78 are made, diametrically opposed, but whose axis 79 is perpendicular to the axis 80 of the pivots 73, 74. In these housings 77, 78 are housed two pivots 81, 82 projecting in relation to the outside diameter 83 of a sleeve 84. The drive in rotation of the sleeve 84 by the drive shaft 56 is ensured by a key 85 housed in the grooves 86, 87 made respectively on the outside circumference 88 of the drive shaft 56 and in the bore 89 of the sleeve 84. Each sleeve 84 is longitudinally positioned and blocked on the drive shaft 56 in such a way that its centre 90 constitutes the point determining the divergence of the corresponding disc. To avoid the discs 40, 41 injuring the dough when it is being drawn in the device 1, these discs 40, 41 are given a rounded edge 91.

The process of drawing operates as follows:

When the prelengthened lump 15, advanced by the feed group 6, falls onto the turning group 37, it is immediately pushed by the discs 40, 41 against the internal wall of the fixed shell 60, which partially surrounds this turning group 37. The rotation of the discs 40, 41 makes the lump progress into the annular space 61, the lump turning round and round because it is pressed against the internal wall of the fixed shell 60.

We refer to FIGS. 6 and 7. Near to the entry 16, to the right of section VI (see FIG. 1), each portion 92, 93 of the lump taken between two consecutive discs 40, $40_1$... represents a section of the length to be drawn. At the end of the drawing travel, to the right of section VII (see FIG. 1) the discs 40, $40_1$... tending by their divergence towards their maximum separation, each portion $92_1$, $93_1$ of the lump 28 taken between two consecutive discs will have been drawn and the diameter of the lump will have diminished.

Between going into and leaving the annular space 61, the prelengthened lumps will have been positively drawn by a length equal to the sum of the spaces 94, 95 between the divergent discs 40, $40_1$... which will have taken up the lump 15 at the entry 16 of the drawing device. The number of discs 40, $40_1$... acting is a function of the initial length of the prelengthened lump 13, i.e. of the adjustment of the shaper-lengthener 2.

Certain shapers deliver lumps that are thicker in the middle. If at the exit of the drawing device 1 it is desired to obtain drawn lumps of cylindrical shape, it is necessary to provide the turning group 37 with means of obtaining greater divergences between the discs 40, $40_1$ ..., 41, $41_1$... situated close to the median plane 42 in relation to the divergences of the discs $40_5$, $40_6$..., $41_5$, $41_6$... situated farthest away from the median plane 42.

For this purpose, it is sufficient to provide blocking studs 54 with a diameter that is larger near the median plane 42 than at the extremities of the traverse 55, and to wedge at corresponding distances the sleeves 84 on the drive shaft 56.

Moreover, by rolling the drawn lumps 30 against the fixed wall 24, the endless carpet 25 of the disengagement group 22 ensures not only the function of evacuator but also a function of equalizing and finishing the lump 31 to remove, if necessary, any circular prints caused during drawing by the rounded edges 91 of the discs 40, $40_1$...

Although the invention has been described in relation to a particular form of realization, it is limited only by the claims, and various modifications of shapes, materials and combinations of these different elements can be made without departing from the context and spirit of the invention.

I claim:

1. Apparatus for positively drawing to greater length lumps of prelengthened dough comprising, a plurality of rotationally driven discs disposed side-by-side so that the periphery thereof engages the lumps of prelengthened dough for drawing thereof during rotation of the driven discs, means for defining in conjunction with said discs a space radially of the discs through which the lumps of prelengthened dough pass disposed peripherally of the driven discs for drawing thereof by the peripheries of the driven discs while in said space, said space having a limited extent in a circumferential direction of the discs and having an elongated inlet into which the prelengthened dough is introduced extending in contact with the periphery of at least some of the driven discs and having an elongate outlet at which the prelengthened dough is discharged by peripheries of the driven discs in a drawn and lengthened state, means for feeding successively the prelenthened lumps of dough into said inlet of said space disposed across said some of the discs, and means for discharging the drawn and lenthened lumps of dough from said apparatus after being discharged at said outlet of said spaced successively.

2. Apparatus for positively drawing to greater length lumps of prelengthened dough according to claim 1, in which said discs are disposed in a group in side-by-side relationship and along one side of the group the discs are closely spaced and on the opposite side of the group the discs are more widely spaced.

3. Apparatus for positively drawing to greater length lumps of prelengthened dough according to claim 1, in which the discs define a drum-like configuration having a common axis of rotation.

4. Apparatus for positively drawing to greater length lumps of prelengthed dough according to claim 1, in which the discs are circular and each have diameters of equal length.

5. Apparatus for positively drawing to greater length lumps of prelengthened dough according to claim 1, in which said means for defining in conjunction with said discs a space is adjustable for varying the space dimension radially of the discs.

6. Apparatus for positively drawing to greater length lumps of prelengthened dough according to claim 1, including a driven shaft driving said discs in common coaxially.

7. Apparatus for positively drawing to greater length lumps of prelengthened dough according to claim 1, in which the last two mentioned means are adjustable in dependence upon the length and weight of the lumps of dough.

8. Apparatus for positively drawing to greater length lumps of prelengthened dough according to claim 1, in which said means for defining a space in conjunction with said discs defines a surface disposed spaced radially of the peripheries of the side-by-side discs.

9. Apparatus for positively drawing to greater length lumps of prelengthened dough according to claim 8, in which said surface extends a limited extent in a circumferential direction of the discs.

10. Apparatus for positively drawing to greater lengths of prelengthened dough according to claim 9, in which said surface has an extent circumferentially of the discs about a hemisphere thereof.

11. Apparatus for positively drawing to greater length lumps of prelengthened dough according to claim 1, in which said discs are circular and have unequal diameters, and in which said means for defining in conjunction with said discs said space defines a surace arcuate in cross-section equally spaced from the periphery of the individual discs.

12. Apparatus for positively drawing to greater length lumps of prelengthened dough according to claim 11, in which the discs have an increasing diameters in both axial directions from the axial center of the plurality of discs, and in which said surface is convex in cross section in a direction toward the peripheries of the discs.

13. Apparatus for positively drawing to greater length lumps of prelengthened dough according to claim 1, in which said means for feeding successively the prelengthened lumps of dough comprises a feed chute having an elongated endless belt having oppositely traveling runs disposed generally vertically defining a movable side of said feed chute for feeding the lumps of prelengthened dough downwardly disposed for delivering onto the discs for deliverty thereby into said elongate inlet into said space.

14. Apparatus for positively drawing to greater length lumps of prelengthened dough according to claim 13, in which said means for discharging the drawn and lengthened lumps of dough from the apparatus comprises an output delivery chute thriving on elongated endless belt having travelling generally vertically disposed runs disposed below said elongate outlet from said space defining a movable side of a generally vertical output delivery chute for delivery of the drawn and elongated lumps of dough downwardly, and a travelling conveyor receiving the lumps of dough from said delivery chute for removal from the apparatus.

15. Apparatus for positively drawing to greater length lumps of prelengthened dough according to claim 13, in which said means for feeding successively the prelengthened lumps of dough comprises a shaper-lengthener for receiving lumps of dough and prelengthening them and deliverying them to said feed chute.

* * * * *